(12) United States Patent
Sun et al.

(10) Patent No.: US 10,107,165 B2
(45) Date of Patent: Oct. 23, 2018

(54) METHOD AND APPARATUS FOR CONTROLLING REDUCTANT INJECTION INTO AN EXHAUST GAS FEEDSTREAM OF AN INTERNAL COMBUSTION ENGINE

(71) Applicant: GM GLOBAL TECHNOLOGY OPERATIONS LLC, Detroit, MI (US)

(72) Inventors: Min Sun, Troy, MI (US); Anthony B. Will, Macomb Township, MI (US); Ping Ge, Northville Township, MI (US); Shifang Li, Shelby Township, MI (US); Gongshin Qi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 184 days.

(21) Appl. No.: 15/190,285

(22) Filed: Jun. 23, 2016

(65) Prior Publication Data
US 2017/0370261 A1    Dec. 28, 2017

(51) Int. Cl.
*F01N 11/00* (2006.01)
*F01N 3/10* (2006.01)
*F01N 3/20* (2006.01)

(52) U.S. Cl.
CPC ............ *F01N 3/208* (2013.01); *F01N 3/106* (2013.01); *F01N 11/007* (2013.01); *F01N 2550/05* (2013.01); *F01N 2560/026* (2013.01); *F01N 2610/02* (2013.01)

(58) Field of Classification Search
CPC ........ F01N 11/007; F01N 3/106; F01N 3/208; F01N 2550/05; F01N 2560/026; F01N 2610/02
See application file for complete search history.

(56) References Cited

U.S. PATENT DOCUMENTS

| | | | |
|---|---|---|---|
| 2014/0020364 A1* | 1/2014 | Wittrock | F01N 3/10 60/274 |
| 2014/0056790 A1* | 2/2014 | Geveci | F01N 3/208 423/212 |
| 2014/0360166 A1* | 12/2014 | Chandrasekaran | F01N 11/00 60/274 |

* cited by examiner

*Primary Examiner* — Brandon Lee
(74) *Attorney, Agent, or Firm* — Quinn IP Law

(57) ABSTRACT

An exhaust aftertreatment system including a selective catalytic reduction device (SCR), a NOx sensor and a reductant injection system is described. A method for controlling the reductant injection system to inject reductant into the exhaust gas feedstream upstream relative to the SCR includes monitoring engine operation, and determining an initial reductant dosing rate responsive to the engine operation. A dosing perturbation is induced in the reductant dosing rate. The exhaust gas feedstream is monitored via the NOx sensor, and a reductant dosing correction term is determined based upon the monitoring. A final dosing rate for controlling the reductant injection system is determined based upon the initial reductant dosing rate, the dosing perturbation, and the reductant dosing correction term.

17 Claims, 3 Drawing Sheets

METHOD AND APPARATUS FOR CONTROLLING REDUCTANT INJECTION INTO AN EXHAUST GAS FEEDSTREAM OF AN INTERNAL COMBUSTION ENGINE

TECHNICAL FIELD

This disclosure relates to internal combustion engines that are fluidly coupled to exhaust aftertreatment systems, and methods for their control.

BACKGROUND

Internal combustion engines fluidly couple to exhaust aftertreatment systems that purify exhaust gases generated as byproducts of combustion. Exhaust aftertreatment systems may include oxidation catalysts, reduction catalysts, selective catalytic reduction catalysts and particulate filters. Byproducts of combustion may include unburned hydrocarbons, carbon monoxide, nitrides of oxide, which may be referred to as NOx molecules, and particulate matter. Operation may be monitored by one or more sensing devices that are disposed in the exhaust gas feedstream, including, e.g., a NOx sensor. Operation may also be determined employing simulation models that dynamically execute during operation.

Selective catalytic reduction catalysts (SCRs) may employ reductants for reducing NOx molecules to elemental nitrogen. One known reductant is urea, which may be transformed into ammonia (NH3) in an exhaust system. The reductant may be injected into the exhaust gas feedstream upstream of one or multiple selective catalytic reduction catalysts, and may be stored on a surface or otherwise captured for use in reducing NOx molecules to elemental nitrogen and water.

Signal output from a downstream NOx sensor may exhibit a cross-sensitivity between NOx molecules and NH3 molecules when disposed to monitor an exhaust gas feedstream downstream of an SCR. As such, known reductant injection control systems operating in an open-loop control scheme to control reductant injection may be operating in an underdosing or an overdosing condition, depending upon magnitude of NH3 exiting the SCR. An open-loop reductant control system may result in reduced performance of an SCR that is sensitive to hardware variation and may result in a false-positive output from a diagnostic monitoring routine for an SCR under certain operating conditions.

SUMMARY

An internal combustion engine fluidly coupled to an exhaust aftertreatment system is described. The exhaust aftertreatment system includes a selective catalytic reduction device (SCR), a NOx sensor disposed to monitor the exhaust gas feedstream downstream relative to the SCR and an injection system disposed to inject a reductant into the exhaust gas feedstream upstream relative to the SCR. A method for controlling the reductant injection system to inject reductant into the exhaust gas feedstream upstream relative to the SCR includes monitoring engine operation, and determining an initial reductant dosing rate responsive to the engine operation. A dosing perturbation is induced in the reductant dosing rate. The exhaust gas feedstream is monitored via the NOx sensor, and a reductant dosing correction term is determined based upon the monitoring. A final dosing rate for controlling the reductant injection system is determined based upon the initial reductant dosing rate, the dosing perturbation, and the reductant dosing correction term.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
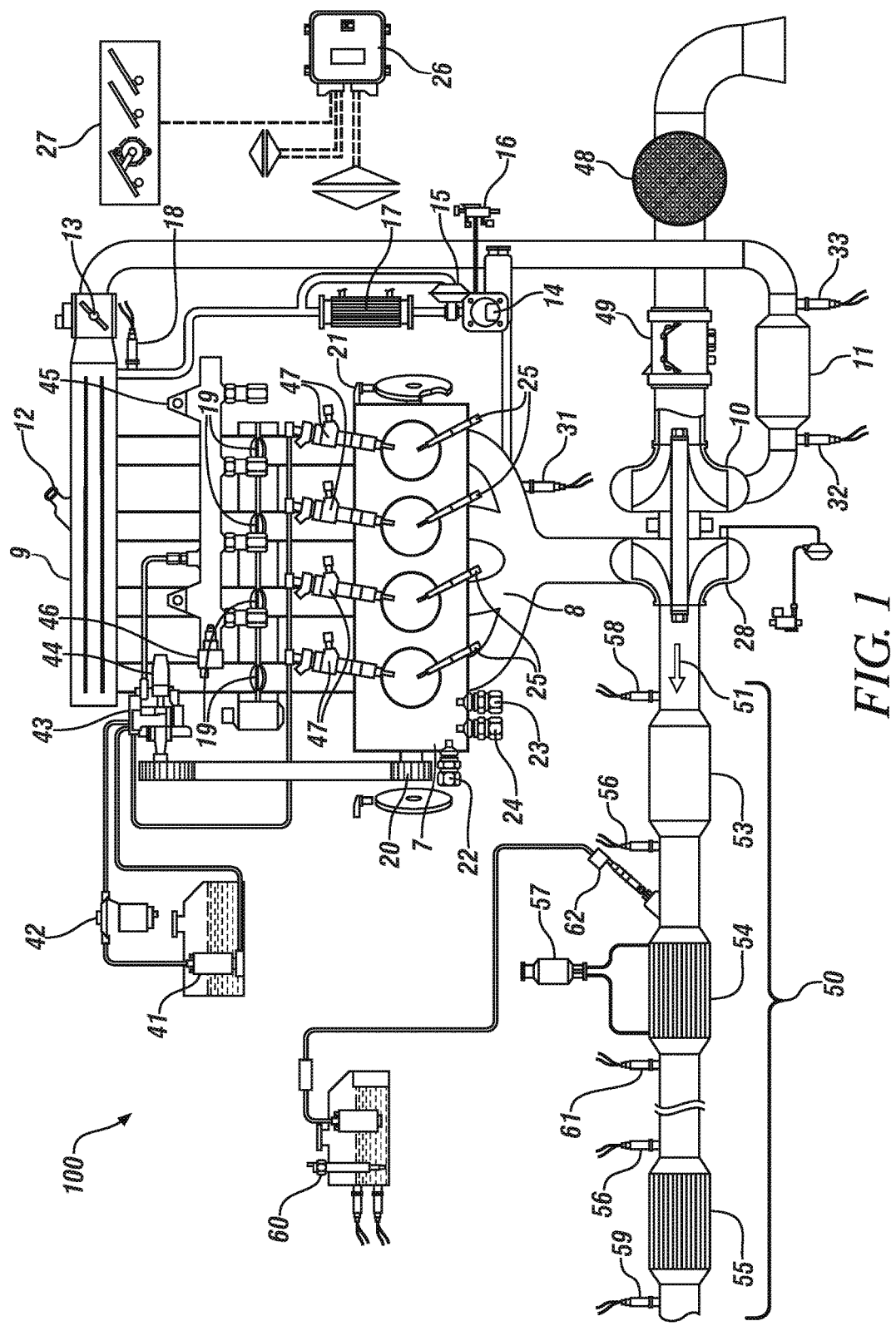
FIG. 1 schematically illustrates an internal combustion engine fluidly coupled to an exhaust gas aftertreatment system including an oxidation catalyst disposed upstream relative to a selective catalytic reduction device (SCR) and a particulate filter, in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 100 that is fluidly coupled to an exhaust aftertreatment system 50 that is arranged in accordance with an embodiment of this disclosure. The engine 100 is a multi-cylinder internal combustion engine that combusts a mixture of directly-injected fuel, intake air and recirculated exhaust gas to generate mechanical power. The engine 100 is configured as a compression-ignition engine as shown, although the concepts described herein may be employed on other engine configurations that employ embodiments of the exhaust aftertreatment system 50 described herein. The engine 100 may be employed on a ground vehicle, e.g., a passenger car, truck, agricultural vehicle or a construction vehicle, on a marine vehicle, or in a stationary setting, e.g., coupled to an electric power generator. As employed herein, the term "upstream" and related terms refer to elements that are towards an origination of a flow stream relative to an indicated location, and the term "downstream" and related terms refer to elements that are away from an origination of a flow stream relative to an indicated location.

The engine 100 preferably includes a multi-cylinder engine block 7, an intake manifold 8 for channeling intake air to the cylinders of the engine 100, and an exhaust manifold 9 for entraining exhaust gas for channeling through the exhaust aftertreatment system 50. Other unillustrated engine components and systems include pistons, crankshaft, engine head(s), intake valves, exhaust valves, camshaft(s), and variable cam phasers when employed. The engine 100 preferably operates in a four-stroke combustion cycle of repetitively-executed strokes of intake-compression-combustion-exhaust. A variable geometry turbocharger (VGT) includes a turbine 28 that fluidly couples to the exhaust manifold 9 upstream relative to the exhaust aftertreatment system 50 in one embodiment. The engine 100 includes a plurality of direct-injection fuel injectors 47 that are arranged to directly inject fuel into individual combustion chambers. The injectors 47 may be any suitable direct-injection device, such as solenoid-activated devices in one embodiment. Fuel is supplied to the injectors 47 from a fuel storage tank via a low-pressure fuel pump 41, a fuel filter assembly 42, a high-pressure fuel pump 43, a fuel metering valve 44, a fuel rail 45 and a pressure regulating valve 46. Each of the engine cylinders preferably includes a glow plug 25. The engine 100 also includes an intake air system, which may include an intake air filter 48, a mass air flow sensor 49, a compressor 10 of the VGT, a charge air cooler 11, a throttle valve 13, a sensor 12 for monitoring boost pressure and intake air temperature, and other sensing devices as may be useful. The engine 100 may include an exhaust gas recirculation (EGR) system that fluidly channels exhaust gas from the exhaust manifold 9 to the intake manifold 8. In one embodiment, the EGR system may include an EGR valve 14, an EGR cooler 17 including a bypass valve 15, an EGR outlet temperature sensor 18, an EGR cooler inlet temperature sensor 31 and a vacuum switch 16. The intake manifold 8 may also include a plurality of swirl valves 19 for mixing intake air and the recirculated exhaust gas. Other engine monitoring sensors may include a crankshaft position sensor 20, a camshaft position sensor 21, a coolant temperature sensor 22, an oil level switch 23 and an oil pressure switch 24, among others. One or more engine monitoring sensors may be replaced with a suitable executable model.

An engine controller 26 monitors various sensing devices and executes control routines to command various actuators to control operation of the engine 100 in response to operator commands. Operator commands may be determined from various operator input devices, including, e.g., a pedal assembly 27 that includes, by way of example, an accelerator pedal and a brake pedal. Other sensing devices associated with engine operation may include, by way of non-limiting example only, a barometric pressure sensor (not shown), an ambient air temperature sensor (not shown), a VGT position sensor (not shown), the exhaust gas temperature sensor 31, an air charge inlet temperature sensor 32 and an air charge outlet temperature sensor 33, among others.

The exhaust aftertreatment system 50 includes a plurality of fluidly connected exhaust purifying devices for purifying engine exhaust gas prior to expulsion to ambient air. An exhaust purifying device may be any device that is configured to oxidize, reduce, filter and/or otherwise treat constituents of the exhaust gas feedstream 51, including but not limited to hydrocarbons, carbon monoxide, nitrides of oxygen (NOx), and particulate matter. In the embodiment shown, first, second and third exhaust purifying devices 53, 54 and 55, respectively, are deployed. The first and second exhaust purifying devices 53, 54 may be closely coupled to the exhaust manifold 9, i.e., located within an engine compartment. The third exhaust purifying device (catalyst) 55 may be distally located, such as in an underfloor location when employed on a ground vehicle. The first exhaust purifying device 53 may be an oxidation catalyst for oxidizing hydrocarbons and other constituents in the exhaust gas feedstream in certain embodiments, and is referred to hereafter as an oxidation catalyst 53. The second exhaust purifying device 54 may be a selective catalyst reduction catalyst, and is referred to hereafter as the SCR 54. In one embodiment, the SCR 54 may also include a particulate filter for filtering particulate matter from the exhaust gas feedstream. A reductant delivery system 60 including a reductant injector 62 having an injection nozzle may be positioned upstream relative thereto to controllably supply reductant into the exhaust gas feedstream to facilitate NOx reduction. The third catalyst 55 may be a second oxidation catalyst for oxidizing NH3 that may pass through the SCR 54. Some embodiments may not employ the third catalyst 55. In one embodiment, the SCR 54 may be a urea-based device, and the injected reductant may be urea. As appreciated by those skilled in the art, urea may convert to ammonia (NH3), which may be stored on the substrate of the SCR 54, and may react with and reduce NOx molecules to form elemental nitrogen (N2) and other inert gases.

Each of the oxidation catalyst 53, SCR 54 and third catalyst 55 includes a ceramic or metallic substrate having flow channels that have been coated with suitable materials including, by way of non-limiting examples: platinum-group metals such as platinum, palladium and/or rhodium; other metals, such as copper; cerium; and other materials. The coated materials effect chemical reactions to oxidize, reduce, filter or otherwise treat constituents of the exhaust gas feedstream under certain conditions related to temperature, flowrate, air/fuel ratio and others. The embodiment shown includes the elements of the exhaust aftertreatment system 50 in one arrangement, which is illustrative. In an alternative embodiment, the particulate filter and the oxidation catalyst may be collocated on a single substrate as part of the oxidation catalyst 53 and collocated within a single mechanical assembly. Other arrangements of the elements of the exhaust aftertreatment system 50 may be employed within the scope of this disclosure, with such arrangements including addition of other exhaust purifying devices and/or omission of one or more of the exhaust purifying devices, depending upon requirements of the specific application.

Sensors for monitoring the exhaust purifying devices of the exhaust aftertreatment system 50 may include first and second exhaust gas sensors 58, 61, respectively, one or multiple particulate matter sensors 56, and a delta pressure sensor 57 for monitoring pressure drop across the SCR 54, one or multiple temperature sensors 59, and/or other suitable sensing devices and models for monitoring the exhaust gas feedstream. The first and second exhaust gas sensors 58, 61 are preferably configured as NOx sensors, and in one embodiment may include wide-range lambda sensing capability. Such sensors and models may be arranged to monitor or otherwise determine parameters related to the exhaust gas feedstream at specific locations. As such, the aforementioned sensors and/or models may be advantageously employed to monitor performance of individual ones of the exhaust purifying devices, monitor parameters associated with performance of a subset of the exhaust purifying devices, or monitor parameters associated with performance of the overall exhaust aftertreatment system 50. The first exhaust gas sensor 58 is preferably arranged to monitor the exhaust gas feedstream upstream relative to the oxidation catalyst 53, as shown. Alternatively, or in addition, the first exhaust gas sensor 58 may be arranged to monitor the exhaust gas feedstream downstream of the oxidation catalyst 53 (not shown). The second exhaust gas sensor 61 is disposed to monitor the exhaust gas feedstream downstream relative to SCR 54. The first and second exhaust gas sensors 58, 61 may be fabricated as a planar-type zirconium oxide dual cell device having a sensing element and an integrated electrically-powered heating element.

Engine control includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 100 and transfer heat or otherwise warm up various ones of the first oxidation catalyst 53, the SCR 54 and the third catalyst 55 so as to effect efficacious operation thereof.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

Figure 2:
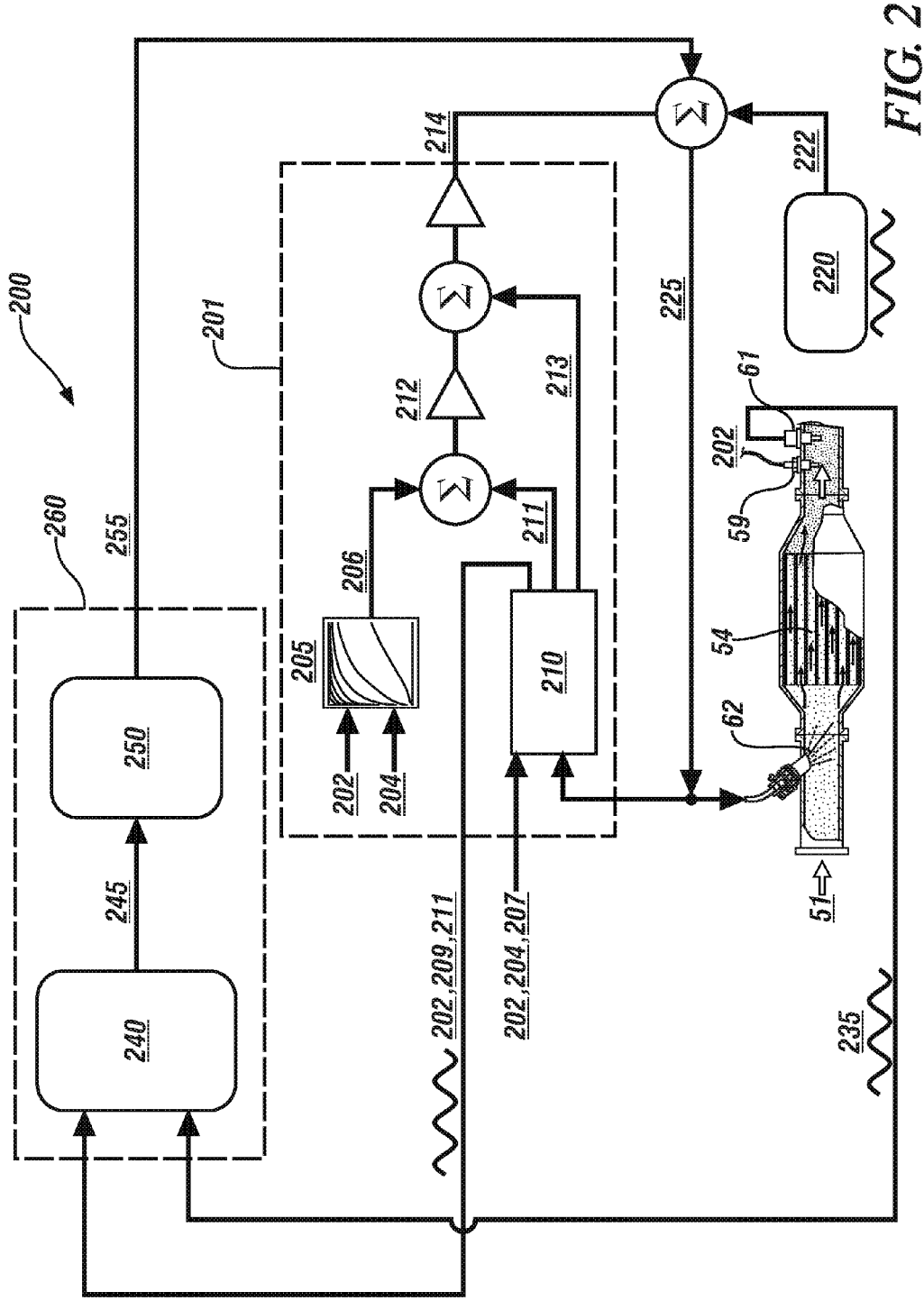
FIG. 2 schematically shows a closed-loop reductant injection control routine that may be employed to control reductant injection upstream of an SCR that is an element of an exhaust aftertreatment system described with reference to FIG. 1 for purifying exhaust gases produced as a byproduct of combustion in an internal combustion engine, in accordance with the disclosure.

FIG. 2 schematically shows a closed-loop reductant injection control routine 200 that may be employed to control reductant injection upstream of an SCR that is an element of an exhaust aftertreatment system for purifying exhaust gases produced as a byproduct of combustion in an internal combustion engine. One such embodiment of an aftertreatment system is described with reference to FIG. 1, including the SCR 54, the reductant injector 62, the temperature sensor 59 and the NOx sensor 61. The closed-loop reductant injection control routine 200 includes an initial dosing routine 201, a perturbation routine 220 and a feedback routine 260 that cooperate to determine a final reductant dosing rate 225, which may be employed to control reductant injection and manage ammonia storage on the SCR 54.

Overall, the closed-loop reductant injection control routine 200 includes monitoring engine operation and other factors to determine an initial reductant dosing rate 214 that is responsive to the engine operation, and inducing a time-varying dosing perturbation 222 in the initial reductant dosing rate 214. During operation, the exhaust gas feedstream downstream relative to the SCR 54 is monitored via the second exhaust gas sensor 61. Reductant overdosing and associated ammonia slip, or reductant underdosing and associated NOx breakthrough may be determined based upon the induced time-varying dosing perturbation 222 in the reductant dosing rate, the engine operation and the input from the second exhaust gas sensor 61 that is monitoring the exhaust gas feedstream downstream relative to the SCR 54. Reductant overdosing and associated ammonia slip may be indicated when the input from the second exhaust gas sensor 61 does not correlate with an estimated magnitude of NOx breakthrough that is output from the SCR 54. Reductant underdosing and associated NOx breakthrough may be indicated when the input from the second exhaust gas sensor 61 correlates with the estimated magnitude of NOx breakthrough that is output from the SCR 54.

A reductant dosing correction term 255 may be generated based thereon. A final reductant dosing rate 225 for controlling the reductant injector 62 of the reductant injection system 60 is determined based upon the initial reductant dosing rate 214, the time-varying dosing perturbation 222, and the presence of the reductant in the exhaust gas feedstream. The final reductant dosing rate 225 may be employed to control reductant injection to manage ammonia storage on the SCR 54.

The initial dosing routine 201 determines the initial reductant dosing rate 214, as follows. Inputs to the initial routine 201 preferably include a plurality of sensed or estimated engine and exhaust system operating parameters, which preferably include SCR temperature 202, exhaust gas mass flowrate 204, and other parameters 207 related to the exhaust gas feedstream 51, such as an air/fuel ratio, and exhaust gas constituents such as NO, NO2, O2, etc. The operating parameters may be monitored directly or inferred based upon monitored operating states of the engine. Other parameters may include an exhaust gas temperature and space velocity for the SCR 54, wherein the space velocity is determined based upon a displaced volume (ml) of the SCR 54 and a volumetric flowrate (l/s) of the exhaust gas. Those skilled in the art are able to determine space velocity for exhaust aftertreatment devices such as the SCR 54 that is described with reference to FIG. 1.

The initial dosing routine 201 includes a model portion 210 to determine an effective amount of ammonia that is stored on the SCR 54 based upon the sensed or estimated engine and exhaust system operating parameters and a final reductant dosing rate 225, wherein the final reductant dosing rate 225 preferably includes the time-varying dosing perturbation 222. The model portion 210 includes a one-dimensional kinetic model of the SCR 54. One-dimensional kinetic models of SCRs are known to those skilled in the art.

The model portion 210 generates outputs that include an estimated amount of stored ammonia 211, an estimated ammonia consumption rate 213, and an estimated ammonia and NOx breakthrough 209 that is output from the SCR 54 based upon the sensed or estimated engine and exhaust system operating parameters. The SCR temperature 202 and the exhaust gas mass flowrate 204 are applied to an SCR ammonia storage model 205 to determine an ammonia storage setpoint 206 that is associated with the SCR 54. The SCR ammonia storage model 205 indicates a maximum ammonia storage capacity for the SCR 54 based upon its temperature and space velocity, which becomes the ammonia storage setpoint 206. Injecting additional amounts of ammonia into the exhaust gas feedstream may lead to breakthrough of ammonia, referred to as ammonia slip. States of temperatures, space velocities, and other operating parameters are application-specific and may be determined employing known engineering practices during product development, or may otherwise be determined. The ammonia storage setpoint 206 and the estimated amount of stored ammonia 211 are arithmetically subtracted and adjusted by a gain factor 212, and the resultant is arithmetically reduced by the estimated ammonia consumption rate 213 to determine the initial reductant dosing rate 214.

The perturbation routine 220 generates the time-varying dosing perturbation 222. The time-varying dosing perturbation 222 may be a signal that is sinusoidal in shape, having a magnitude that is +/−10% of a maximum magnitude of the reductant dosing and a period of 10+ seconds in one embodiment. Other perturbation schemes having different shapes, magnitudes and periods may be employed and thus fall within the scope of this disclosure.

The feedback routine 260 includes a correlation routine 240 and a closed-loop control routine 250. Inputs to the feedback routine 260 include the SCR temperature 202, the estimated ammonia and NOx breakthrough 209 and the estimated amount of stored ammonia 211, which are provided from the initial dosing routine 201, and a sensor signal 235 that is output from the second exhaust gas sensor 61.

Figure 3:
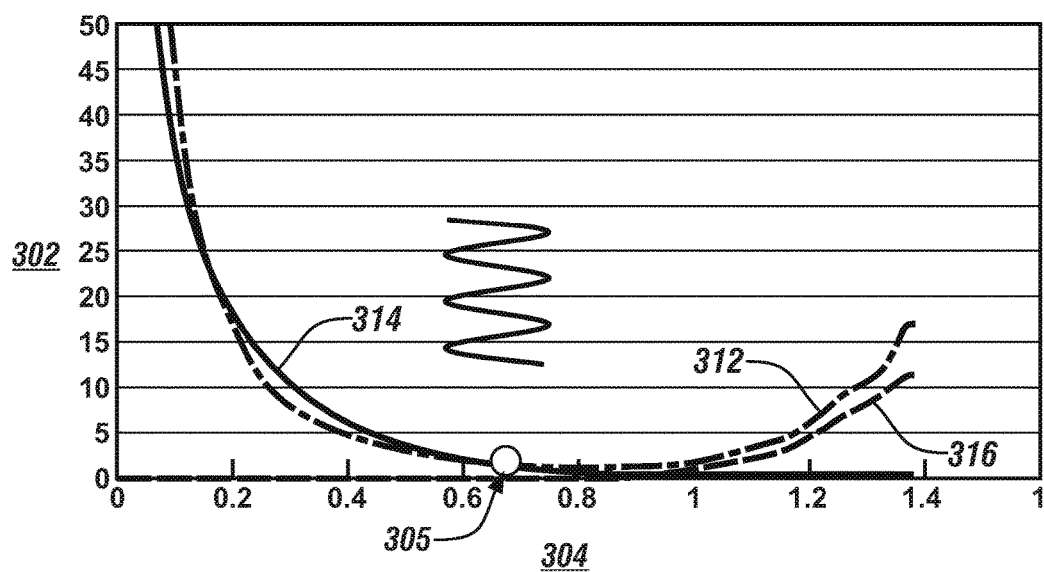
FIG. 3 graphically shows a signal output from an exemplary NOx sensor, e.g., the NOx sensor signal that is output from an embodiment of the second exhaust gas sensor, wherein the signal output indicates a cross-sensitivity between NOx and NH3, in accordance with the disclosure.

FIG. 3 graphically shows a signal generated by an exemplary NOx sensor, e.g., the NOx sensor signal that is generated by an embodiment of the second exhaust gas sensor 61. The NOx sensor generates an output signal that is responsive to nitrogen, and thus detects both NOx molecules and ammonia (NH3) molecules. As such, the signal output from the NOx sensor exhibits a cross-sensitivity between NOx and NH3. The graph includes a combined magnitude of NOx and NH3 302 on the vertical axis in relation to stored NH3 304 on the horizontal axis. Plotted parameters include NOx sensor signal 312, NOx 314, and NH3 316. A preferred operating point 305 is indicated, which includes engine operation that achieves a low NOx state in combination with a low NH3 state. When NH3 316 increases, the NOx sensor signal 312 increases, as indicated by the lines to the right of the preferred operating point 305. When NOx 314 increases, the NOx sensor signal 312 also increases, as indicated by the lines to the left of the preferred operating point 305.

Referring again to FIG. 2, the addition of the time-varying dosing perturbation 222 to the initial reductant dosing rate 214 permits distinguishing between increasing NH3 slip and increasing NOx breakthrough based upon the NOx sensor signal 235. As such, a decrease in the initial reductant dosing rate 214 has a corresponding effect on the signal output from the NOx sensor signal 235 that relates to an increase in NOx emissions, i.e., NOx breakthrough. In contrast, an increase in the initial reductant dosing rate 214 has a corresponding effect on the signal output from the NOx sensor signal 235 that relates to an increase in NH3 slip.

The correlation routine 240 determines a statistical correlation between the sensor signal 235 and each of the estimated amount of stored ammonia 211, the estimated NOx breakthrough 209 and the SCR temperature 202, preferably at a time span that is the same as the dosing perturbation period. The statistical correlation between the sensor signal 235 and each of the estimated amount of stored ammonia 211, the estimated NOx breakthrough 209 and the SCR temperature 202 preferably is in the form of a time-synchronized correlation of the aforementioned terms, taking into consideration the relationship between the NOx sensor signal, NH3 and NOx that is described with reference to FIG. 3. The correlation routine 240 generates a correction term 245 that is based upon one of the aforementioned correlations or a combination thereof. The correction term 245 is determined from the correlation and the SCR-out NOx sensor signal. As an example, the correction term can be determined from multiplication between the correlation and sinusoid wave amplitude, which is extracted from the SCR-out NOx sensor signal at the same frequency as the dosing perturbation frequency.

The correction term 245 is provided to the closed-loop control routine 250, which includes a suitable proportional-integral (PI) control routine or a suitable proportional-integral-derivative (PID) control routine that generates the reductant dosing correction term 255 based thereon. The target is to control the correction term 245 to be at a desired level. PI and PID control routines are known to those skilled in the art, and not described in detail herein. The initial reductant dosing rate 214, the time-varying dosing perturbation 222, and the reductant dosing correction term 255 are additively combined to determine the final reductant dosing rate 225, which is employed to control the reductant delivery system 60 including the reductant injector 62.

The concepts described herein include a method to distinguish NOx or NH3 from a NOx sensor signal by continuously perturbing an NH3 dosing rate with a given frequency sine wave and then correlating SCR-out NOx sensor signal with an estimated SCR-out NOx, NH3 storage or temperature at a time span that is the same as the dosing perturbation period. A correction term can be determined from the correlations and a signal extracted from SCR-out NOx sensor signal. A closed-loop routine is then used to control the correction term at a desired level employing a PID controller to generate the reductant dosing correction term. The method is to be used for closed-loop dosing control to accurately control SCR NH3 storage to reduce SCR NOx reduction efficiency variation caused by SCR hardware and operation condition variability and minimizing NH3 consumption. The method can also be used to reduce SCR efficiency and monitor false triggering.

As described herein, the signal output from the NOx sensor disposed downstream of the SCR can be identified as being associated with elevated NOx emissions or elevated NH3 emissions when subjected to the continuous perturbation of the NH3 dosing rate that is correlated with the estimated SCR-out NOx emissions. The closed-loop reductant injection control routine 200 described with reference to FIG. 2 can be advantageously employed to reduce NOx reduction variation while minimizing NH3 consumption and breakthrough in an embodiment of the aftertreatment system 50 described with reference to FIG. 1 employing such correlation.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling reductant injection into an exhaust aftertreatment system for an internal combustion engine, wherein the exhaust aftertreatment system includes a selective catalytic reduction device (SCR), a NOx sensor disposed to monitor the exhaust gas feedstream downstream relative to the SCR, and a reductant injection system disposed to inject reductant into the exhaust gas feedstream upstream relative to the SCR, the method comprising:
   monitoring engine operation;
   determining an initial reductant dosing rate responsive to the engine operation;
   inducing a dosing perturbation in the initial reductant dosing rate;
   monitoring, via the NOx sensor, the exhaust gas feedstream downstream relative to the SCR;
   determining, via a controller, a reductant dosing correction term based upon a signal output from the NOx sensor, including:
      estimating NOx breakthrough output from the SCR and an amount of ammonia stored on the SCR based upon engine and exhaust system operating parameters associated with the monitored engine operation,
      executing a time-synchronized correlation between the estimated NOx breakthrough output from the SCR, the signal output from the NOx sensor, and the amount of ammonia stored on the SCR, and
      determining the reductant dosing correction term based upon the time-synchronized correlation of the estimated NOx breakthrough output from the SCR, the amount of ammonia stored on the SCR and the signal output from the NOx sensor;
   determining a final dosing rate for controlling the reductant injection system based upon the initial reductant dosing rate, the dosing perturbation, and the reductant dosing correction term; and
   controlling the reductant injection system based upon the final dosing rate.

2. The method of claim 1, wherein the dosing perturbation in the reductant dosing rate comprises a time-varying dosing perturbation in the reductant dosing rate.

3. The method of claim 2, wherein the time-varying dosing perturbation in the reductant dosing rate comprises a sinusoidal time-varying dosing perturbation.

4. The method of claim 1, wherein the reductant correction term indicates reductant overdosing when the estimated NOx breakthrough output from the SCR does not correlate with the signal output from the NOx sensor.

5. The method of claim 4, wherein the estimated NOx breakthrough output from the SCR does not correlate with the signal output from the NOx sensor when a signal output from the NOx sensor does not correlate with the estimated magnitude of NOx breakthrough output from the SCR.

6. The method of claim 1, wherein the reductant dosing correction term indicates reductant underdosing when the estimated NOx breakthrough output from the SCR correlates with the signal output from the NOx sensor.

7. The method of claim 6, wherein the estimated NOx breakthrough output from the SCR correlates with the signal output from the NOx sensor when the signal output from the NOx sensor correlates with the estimated magnitude of NOx breakthrough output from the SCR.

8. The method of claim 1, further comprising employing a proportional-integral-derivative (PID) controller to control the reductant injection system based upon the final dosing rate.

9. A method for controlling reductant injection into an exhaust aftertreatment system disposed to purify an exhaust gas feedstream from a compression-ignition internal combustion engine, wherein the exhaust aftertreatment system includes an oxidation catalyst disposed upstream of a selective catalytic reduction device (SCR), wherein a NOx sensor is disposed to monitor the exhaust gas feedstream downstream relative to the SCR, and wherein a reductant injection system is disposed to inject reductant into the exhaust gas feedstream downstream relative to the oxidation catalyst and upstream relative to the SCR, the method comprising:
   inducing a dosing perturbation in an initial reductant dosing rate;
   monitoring, via the NOx sensor, the exhaust gas feedstream downstream relative to the SCR;
   determining, via a controller, a reductant dosing correction term based upon a signal output from the NOx sensor, including:
      estimating NOx breakthrough output from the SCR and an amount of ammonia stored on the SCR based upon engine and exhaust system operating parameters associated with the monitored engine operation,
      executing a time-synchronized correlation between the estimated NOx breakthrough output from the SCR, the signal output from the NOx sensor, and the amount of ammonia stored on the SCR, and
      determining the reductant dosing correction term based upon the time-synchronized correlation of the estimated NOx breakthrough output from the SCR, the amount of ammonia stored on the SCR and the signal output from the NOx sensor;
   determining a final dosing rate for controlling the reductant injection system based upon the initial reductant dosing rate, the dosing perturbation, and the reductant dosing correction term; and
   controlling the reductant injection system to inject the reductant based upon the final dosing rate.

10. An exhaust aftertreatment system and controller disposed to purify an exhaust gas feedstream for an internal combustion engine, comprising:
- a selective catalytic reduction device (SCR) disposed downstream relative to an oxidation catalyst;
- a NOx sensor disposed to monitor the exhaust gas feedstream downstream relative to the SCR;
- a reductant injection system disposed to inject reductant into the exhaust gas feedstream upstream relative to the SCR; and
- the controller operatively connected to the reductant injection system and in communication with the NOx sensor and including an instruction set, the instruction set executable to:
  - monitor operation of the internal combustion engine,
  - determine an initial reductant dosing rate responsive to the engine operation,
  - induce a dosing perturbation in the reductant dosing rate,
  - monitor, via the NOx sensor, the exhaust gas feedstream,
  - determine a reductant dosing correction term based upon a signal output from the NOx sensor, including:
    - estimate NOx breakthrough output from the SCR and an amount of ammonia stored on the SCR based upon engine and exhaust system operating parameters associated with the monitored engine operation,
    - execute a time-synchronized correlation between the estimated NOx breakthrough output from the SCR, the signal output from the NOx sensor, and the amount of ammonia stored on the SCR, and
    - determine the reductant dosing correction term based upon the time-synchronized correlation of the estimated NOx breakthrough output from the SCR, the amount of ammonia stored on the SCR and the signal output from the NOx sensor,
  - determine a final dosing rate for controlling the reductant injection system based upon the initial reductant dosing rate, the dosing perturbation, and the reductant dosing correction term, and
  - control the reductant injection system based upon the final dosing rate.

11. The exhaust aftertreatment system of claim 10, wherein the dosing perturbation in the reductant dosing rate comprises a time-varying dosing perturbation in the reductant dosing rate.

12. The exhaust aftertreatment system of claim 11, wherein the time-varying dosing perturbation in the reductant dosing rate comprises a sinusoidal time-varying dosing perturbation.

13. The exhaust aftertreatment system of claim 10, wherein the reductant dosing correction term indicates reductant overdosing when the estimated NOx breakthrough output from the SCR does not correlate with the monitored exhaust gas feedstream via the NOx sensor.

14. The exhaust aftertreatment system of claim 13, wherein the estimated NOx breakthrough output from the SCR does not correlate with the signal output from the NOx sensor when a signal output from the NOx sensor does not correlate with the estimated magnitude of NOx breakthrough output from the SCR.

15. The exhaust aftertreatment system of claim 10, wherein the reductant dosing correction term indicates reductant underdosing when the estimated NOx breakthrough output from the SCR correlates with the signal output from the NOx sensor.

16. The exhaust aftertreatment system of claim 15, wherein the estimated NOx breakthrough output from the SCR correlates with the signal output from the NOx sensor when the signal output from the NOx sensor correlates with the estimated magnitude of NOx breakthrough output from the SCR.

17. The exhaust aftertreatment system of claim 10, further comprising employing a proportional-integral-derivative (PID) controller to control the reductant injection system based upon the final dosing rate.

* * * * *